3,546,168
POLYESTERS OF POLYARYL DIOLS
Michael George Allen, Hudson, Wis., assignor to Minnesota Mining and Manufacturing Company, St. Paul, Minn., a corporation of Delaware
No Drawing. Continuation-in-part of application Ser. No. 572,895, Aug. 17, 1966. This application Sept. 11, 1969, Ser. No. 857,240
Int. Cl. C08g 17/08
U.S. Cl. 260—47          7 Claims

ABSTRACT OF THE DISCLOSURE

Polyesters of aliphatic and aromatic diacids with polyaryl diols containing at least 8 phenyl rings in tetraphenyl methan configuration, said polyesters being characterized by useful solubility in organic solvents and good stability at moderately high temperature.

---

This is a continuation-in-part of my copending application Serial No. 572,895 filed Aug. 17, 1966, now abandoned.

This invention relates to novel polymeric materials and more particularly to a certain new and useful group of aromatic polyesters and to shaped articles prepared therefrom.

Linear condensation products comprising polymers of diacids with diols are well known in the art, and numerous patents describe such condensation polyesters and modifications thereof, e.g. United States Letters Patent 2,071,250; 2,465,150; 2,589,687; 2,762,789; 2,967,854 and the like. Polyesters in which the comonomers have a preponderance of aromatic residues have likewise been previously prepared, e.g. United States Letters Patent 3,160,602; 3,160,604; 3,185,665; 3,216,970 and the like.

While it has been known that aromatic ring compounds are much more stable and have more desirable high temperature properties than corresponding aliphatic compounds, the wholly aromatic or extremely highly aromatic polyesters heretofore prepared have generally suffered from extreme brittleness, leading to polymers of little or no utility, or insolubility and infusibility, thus preventing their actual utilization for shaped articles. To overcome these deficiencies, the art has resorted to the production of copolymers of specific percentage composition, for example, as in United States Letters Patent 3,160,604, to obtain solubility and other useful properties. Other expedients, such as the addition of high molecular weight plasticizers (which do not contribute to the strength of the polymer but which lower the melting point, etc., and possibly improve the solubility) have also been used in an attempt to produce useful polyesters having extremely high temperature resistence while retaining properties which permit forming them into useful articles.

It is an object of the present invention to produce linear polyesters from certain high molecular weight aromatic diols, which have useful solubility and high temperature properties without special formulation or additives. Another object of the invention is to prepare novel polyesters having useful properties which are capable of being formed into self-supporting films.

It has now been found that polyesters having recurrent units of the formula:

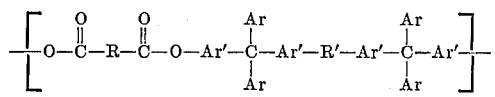

wherein R is a divalent radical of the group consisting of aromatic, aliphatic and ar-aliphatic hydrocarbon groups containing up to 12 carbon atoms which aliphatic and ar-aliphatic groups may contain a single oxa (i.e. —O—) or thia (i.e. —S—) atom, each Ar' is phenylene, each Ar is phenyl or halophenyl and R' is —O—, —S—, —NH— or —CH$_2$—.

The polyesters of the invention are formed by the reaction of a suitable dicarboxylic acid having the formula:

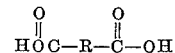

wherein R has the significance set forth above, with a diol having the formula:

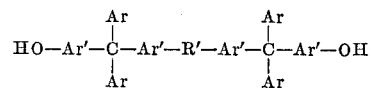

where Ar, Ar' and R' have the significance set forth above.

The diols having the formula set forth above are compounds which are prepared according to the procedures disclosed in the co-pending application of Emery Tokoli, Serial No. 568,111 filed July 27, 1966.

In general, the reactions of the process to form these diols can be characterized as follows:

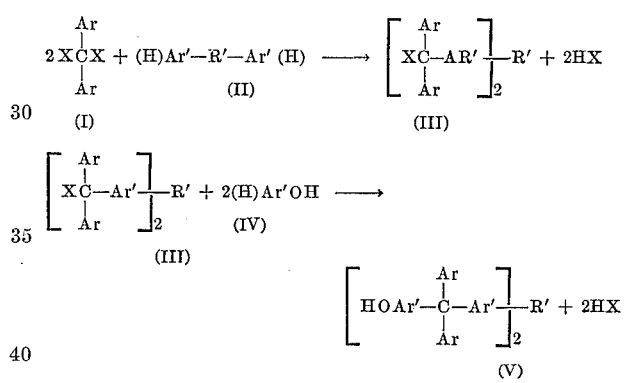

wherein Ar, Ar' and R' have the significance set forth above and X is halogen.

The first step in this process, i.e. the preparation of compounds of type III, is carried out in a solution using a suitable inert solvent, such as carbon disulfide or tetrachloroethylene, at a temperature ranging from about 40 to 150° C. in the presence of a condensation catalyst. Effective catalysts for this reaction are anhydrous Lewis acids (also known as Friedel-Crafts catalysts) such as aluminum chloride, aluminum bromide, ferric chloride, antimony pentachloride, molybdenum pentachloride, indium trichloride, gallium trichloride, etc.

The first halogen atom is removed from compound I quite easily in its reaction with II to form III. Once III if formed, however, the reaction stops since compounds of this type are quite stable. When the preferred catalyst, aluminum chloride, is used, a stable complex is formed between the product (compound III) and the aluminum chloride. This complex can be decomposed with water and the desired product isolated.

In the final step of the process, the remaining halogen (X) is removed, utilizing the more reactive compound IV. This step is carried out in either a melt or in solution and ordinarily at a temperature ranging from 100 to 200° C. A catalyst is generally not needed although a condensation catalyst (such as those listed above) is desirable in some cases. An inert solvent, such as tetrachloroethylene, or an organic carboxylic acid, e.g. acetic acid or propionic acid, can also be utilized.

3

Among the specific intermediate compounds useful in preparing the compounds of the invention are the following:

(I) Diphenyl dichloromethane, diphenyl dibromomethane, p,p′-dichlorodiphenyl dichloromethane, m-trifluoromethylphenyl phenyldichloromethane, 2,4-dichlorophenyl phenyldichloromethane and 2,4-dibromophenyl phenyldichloromethane.

(II) Diphenyl ether, diphenyl thioether, diphenyl amine and diphenyl methane.

The preparation of the diols used in preparing the polymers of the invention is more specifically illustrated by the following examples in which, where not otherwise indicated, parts of solids are by weight and of liquids by volume and temperatures are in degrees centigrade.

EXAMPLE 1

The preparation of bis-(trityl chloride) ether.

A 5-liter flask fitted with a stirrer, thermometer, and a condenser is charged with benzophenone dichloride (471.4 g., 1.97 mole), diphenyl ether (169.0 g. 0.99 mole) and 2 liters of tetrachloroethylene. The solution is cooled to 10° and AlCl₃ (268.0 g., 1.97 mole) is added at such a rate that the temperature does not exceed 17°. The cooling bath is removed and the mixture is slowly warmed to reflux and maintained at this temperature until the evolution of gas ceases.

The mixture is then cooled to 25° and divided into five portions. Each portion is mixed with 80 ml. of water and beaten in a blender until a white color appears. The material is then filtered and the organic filtrates are combined. Hexane (400 ml.) is added and the solution is cooled and allowed to stand for 2 hours. The material is then filtered; the filter cake is washed with hexane and dried to give 357 g. (62.7%) of a white product, M.P. 173–175° C.

In a second preparation of the same compound, a white product melting at 175–177° C. is obtained. Analytical results on this material are as follows:

Calcd. for $C_{39}H_{29}OCl_2$ (percent): C, 79.8; H, 4.9; Cl, 12.9. Found (percent): C, 80.2; H, 5.1; Cl, 12.3.

EXAMPLE 2

The preparation of bis(p-hydroxyphenyltriphenylmethane)ether.

Bis-(triethylchloride)ether (11.4 g., 0.02 mole) and phenol (28.2 g., 0.3 mole) are mixed in a flask and heated on an oil bath for 4 hours at 130–160°. The flask is cooled and the contents are removed and slurried in glacial acetic acid. The mixture is filtered; and the white filter cake is washed with acetic acid, and methanol; and dried in vacuum to give 12 grams (87%) of product, M.P. 325–327°.

Analysis.—Calcd. for $C_{50}H_{38}O_3$ (percent): C, 87.43; H, 5.58. Found (percent): C, 86.0; H, 5.64.

This bis phenol, despite its high melting point, is readily soluble in dioxane.

In a similar manner, the additional compounds shown below are prepared (the reactants and products of the invention being designated by Roman numerals as hereinbefore.)

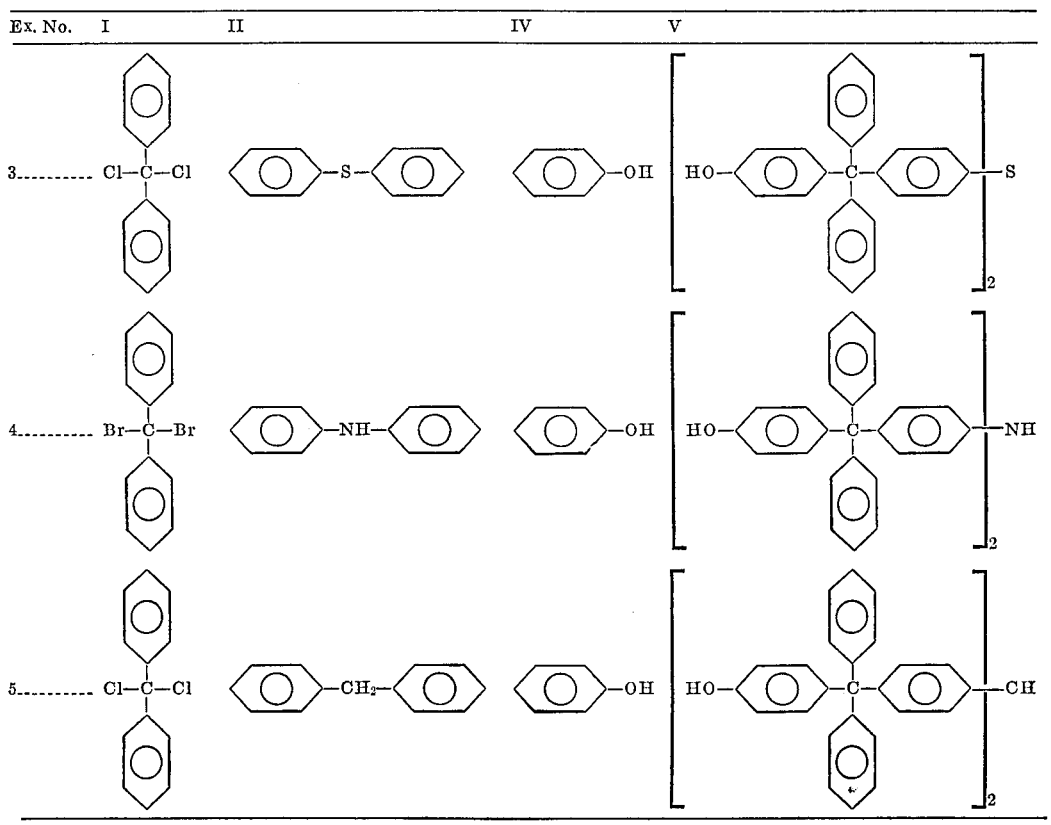

The dicarboxylic acids which are used in preparing the polymers of the invention are those which are known to the art for preparation of polyesters. Useful alpihatic acids include succinic, adipic, thiodipropionic, oxydipropionic, azelaic, sebacic, dodecanedioic and the like acids. Aromaitic diacids useful in preparing the polymers of the invention include isophthalic acid, terephthalic acid, bis-(4 - carboxyphenyl)ether, bis(4 - carboxyphenyl)sulfide, 4,4′-dicarboxybiphenyl, etc. The aromatic dicarboxylic acids normally contain at least 6 carbon atoms in the group between the carboxyls.

Copolymers, which are polyesters prepared from the dicarboxylic acids and new diols are set forth above, with other aromatic diols in proportions ranging from e.g. 10:90 to 90:10 by weight, can be prepared and fall within the scope of the invention. Useful comonomeric diols are exemplified by bisphenol A, hydroquinone, naphthoquinone, p,p′-dihydroxy diphenyl ether, dihydroxydiphenyl sulfide, 4,4′-dihydroxydiphenylamine and the like.

The new polyesters of the invention may be prepared by any of a variety of poly condensation methods described in the prior art. For example, the selected diol may be reacted with a desired diacid chloride in substantially equimolar quantities at high temperature in an inert solvent. The same reaction can be carried out at lower temperatures in the presence of a teritary amine as an acid acceptor. The process can be carried out in the presence of a solvent, e.g. a chlorinated, high boiling aromatic solvent such as highly chlorinated biphenyl.

The polyesters of the invention when of relatively low molecular weight (e.g. inherent viscosity less than about 0.4) are colorless or white, somewhat brittle materials, having considerable compressive strength. When of higher molecular weight, e.g. having inherent viscosity greater than about 0.4, the polymers are strong materials which form tough self-supporting films. They are soluble, as are the lower molecular weight materials, in such solvents as chloroform, methylene chloride, chlorobenzene, chlorinated biphenyl and the like solvents, even at relatively low temperature.

From solutions of the polymers in such solvents, tough self-supporting films can be cast, and fibers and filaments can be made. The polymers of the invention can also be fabricated by melt-pressing and the like. Solutions of these polymers can be used for coating substrates; pigments or fillers can be added to make paints, enamels and the like. Such solutions can also be used to impregnate fabrics and to prepare laminates, as of paper, cloth, glass fiber mats, etc.

Useful coatings of the polyesters of the invention on metallic substrates are produced by spraying, brushing, dipping or otherwise forming solvent-based films on such surfaces followed by removal of solvent. Thus, electrical varnishes and wire coating solutions are readily prepared using these polymers. The films and coatings of the polyesters of the invention have useful dielectric properties even at relatively high temperature.

The following examples, which are more specifically illustrative of the polyesters of the invention, and in which all parts are by weight unless otherwise specified, will more particularly describe the polymers of the invention and the process for their preparation. The examples are not to be considered as limiting the scope of the invention in any way.

EXAMPLE 6

Preparation of a polyester from bis-(p-hydroxyphenyl-triphenylmethane)-ether and terephthaloyl chloride.

The preparation of the polyester is carried out under anhydrous conditions, using anhydrous reactants and an anhydrous atmosphere. All operations are carried out in a glove box filled with dry nitrogen.

A flask fitted with a stirrer, a condenser and means for flushing with nitrogen is charged with 5.088 parts of bis-(p-hydroxyphenyltriphenylmethane)-ether, 1.5 parts of terephthaloyl chloride and 35 parts of a high boiling, chlorinated aromatic solvent (chlorinated biphenyl, available under the trade name "Arochlor"). While maintaining a dry nitrogen atmosphere in the reaction vessel and glove box, the mixture is heated to about 300°–330° C. When the temperature reaches 224° C., gas begins to evolve, and a light brown solution is formed. The reaction mixture is maintained at 300°–330° C. for about one hour, and is then cooled and poured into 500 ml. of heptane. A white, fibrous precipitate appears. The precipitated polymer thus prepared is removed from the solution by filtration, washed with dry heptane and dried in vacuo. About 6 parts of the desired polyester, a white solid, are thus obtained. The inherent viscosity $[\eta]$ is 0.55, measured as a 0.5 percent solution of polymer in chloroform. The infrared spectrum of the material is consistent with the formula. The polymer is soluble in methylene chloride, chloroform and chlorobenzene.

An approximately 15 percent solution of the polymer thus prepared in chloroform is used to cast a film of polymer upon a glass plate. After drying, the polymer film can be stripped from the glass plate. In this way, a transparent, strong film of the polyester is produced.

The same solution was used to coat stainless steel, aluminum and copper sheets. A hard, flexible adherent coating was produced on removal of the solvent, which was strippable when the metal was smooth.

The solution of polymer was also used to coat glass cloth and paper. Strong sheets were formed on removing the solvent. Several sheets could be laminated together in this way to form a tough board.

Long term heat aging study of the polymer shows weight loss of 10 percent after 85 hours at 315° C., in air. The same weight loss occurred after maintaining the polymer for 680 hours at 260° C., in air.

EXAMPLE 7

The procedure of Example 6 is followed, except that isophthaloyl chloride is employed. Correspondingly, poly-bis(p-phenylenetriphenylmethane) ether isophthalate is formed. This polyester is likewise soluble in methylene dichloride, dichlorobenzene and chloroform. The inherent viscosity of the polymer, measured as a 0.5 percent solution in chloroform, was found to be greater than 1.0. A solution of the polymer in chloroform could be cast on a glass plate, and after drying, a strippable film was produced. This film as clear, transparent and strong. It could be folded on itself a number of times before breaking. Long term heat aging study showed that 10 percent of the original weight of the polymer had been lost after about 600 hours at about 260° C.

EXAMPLE 8

Preparation of a polyester from bis-(p-hydroxyphenyl-triphenylmethane)-ether and sebacoyl chloride.

A 50 ml. flask fitted with a stirrer, condenser, thermometer and arrangement for flushing with dry nitrogen was charged with bis-(p-hydroxyphenyltriphenylmethane)-ether (3.43 g.; 0.005 mol), sebacoyl chloride (1.196 g.; 0.005 mol), and 10 ml. of trichlorobenzene. The solution was heated at 150° C. for 1.5 hours, during which time hydrogen chloride was evolved, and the solution thickened. The solution was then cooled to 100° C. and added to 400 ml. of hexane in a Waring Blendor, and stirred. A precipitate formed and was removed by filtration and dried to give 4.0 g. of a white produce. The inherent viscosity $[\eta]$ of a 0.5 percent solution in chloroform was 0.35; the infrared spectrum was consistent with the expected composition of the product. A clear, transparent film was cast from a chloroform solution of the polymer.

EXAMPLE 9

The procedure of Example 6 or 7 is followed, expect that the diol component therein employed is replaced with the stoichiometric equivalent of the following compounds, which are designated by the use of structural formulae as well as their names, for clarity:

Bis-(p-hydroxyphenyltriphenylmethane)-sulfide, having the formula

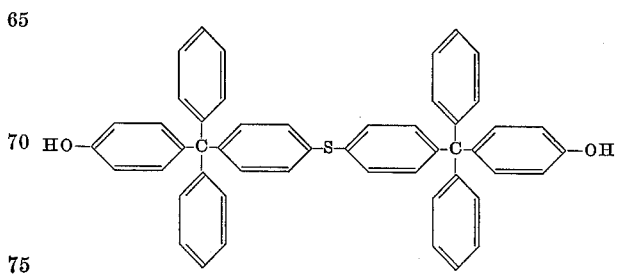

Bis-(p-hydroxyphenyltriphenylmethane)-amine, having the formula

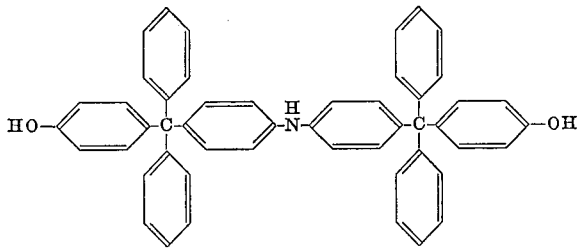

Polyesters are obtained using these starting materials and terephthaloyl chloride, or isophthaloyl chloride, which have properties similar to those set forth in Examples 6 and 7, respectively.

EXAMPLE 10

A series of copolymers was made using bis-(p-hydroxyphenyltriphenylmethane)ether and other aromatic diols. These were made using the process described in Example 6. In each case, the comonomer replaced an amount of the bis-p-hydroxypenyltriphenylmethane)ether. The following table shows the composition of the polymers obtained from the comonomers, the amount of the replacement comonomer diol being noted as a percentage of the total amount of diol employed. The product copolymers were subjected to a heat aging study wherein they were maintained at 260° C. until they had lost 10 percent of their original weight. The time required for loss of 10 percent of the weight of the polymer is also listed in the table.

TABLE I

| Comonomer diol | Weight percent of comonomer | Time, hours [1] |
| --- | --- | --- |
| p,p'-Dihydroxytetraphenyl methane | 25 | 830 |
| Do | 50 | 770 |
| Do | 75 | 840 |
| Do | 90 | 680 |
| Hydroquinone | 10 | 300 |
| Bis-phenol A | 25 | 100 |
| Do | 50 | 50 |
| Do | 65 | 50 |

[1] To 10% weight loss.

EXAMPLE 11

The procedure of Example 6 or 7 is again followed, except that the diol component therein is replaced by the stoichometric equivalent of bis - (p - hydroxyphenyltriphenylmethane)methane.

Polyesters are obtained using this starting material and terephthaloyl chloride and isophthaloyl chloride having properties similar to those set forth in Examples 6 and 7.

What is claimed is:

1. A polymeric film-forming polyester comprised of recurring units having the formula

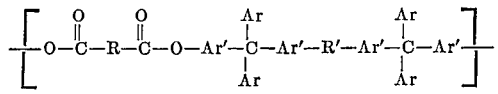

wherein R is a divalent radical of the group consisting of aromatic, aliphatic and ar-aliphatic hydrocarbon groups containing up to 12 carbon atoms which aliphatic and ar-aliphatic groups may contain a single oxa or thia atom, each Ar' is phenylene, each Ar is phenyl or halophenyl and R' is —O—, —S—, —NH— or —CH$_2$—.

2. A polyester according to claim 1 having an inherent viscosity greater than 0.4, measured as a 0.5 percent solution of the polymer in chloroform.

3. A polyester according to claim 1, in which R is a phenylene radical.

4. A self-supporting film of a polyester according to claim 1.

5. Poly - bis(p - phenylenetriphenylmethane) ether terephthalate according to claim 1.

6. Poly - bis(p - phenylenetriphenylmethane) ether isophthalate according to claim 1.

7. Poly - bis(p - phenylenetriphenylmethane) ether sebacate according to claim 1.

References Cited

UNITED STATES PATENTS 3,251,805   5/1966   Schnell et al. _____ 260—47(C)

WILLIAM SHORT, Primary Examiner

L. P. QUAST, Assistant Examiner

U.S. Cl. X.R.

117—124, 126, 155; 161—194, 232; 260—33.8, 576, 609, 612, 613, 619